Aug. 13, 1968   K. HÖTGER   3,396,509
ROTARY TABLE PACKAGING APPARATUS
Filed June 9, 1966   5 Sheets-Sheet 1
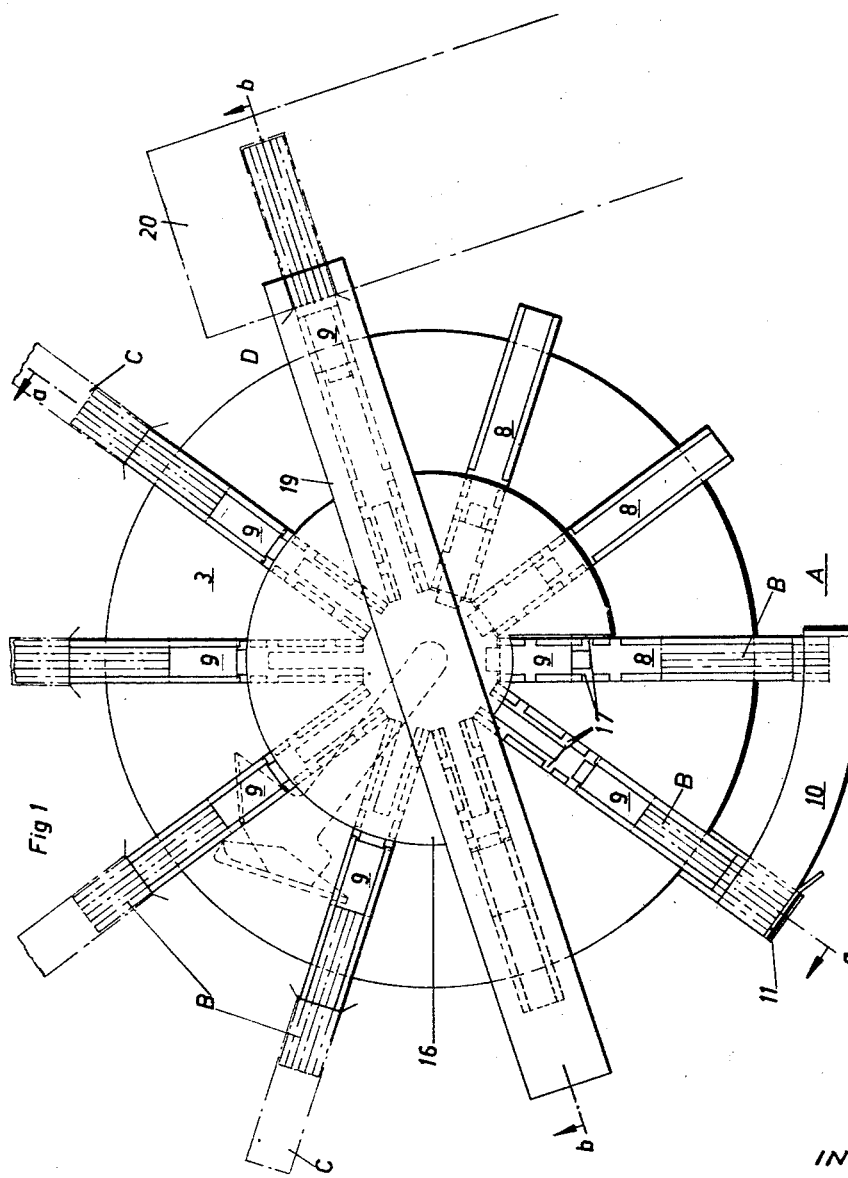
INVENTOR
KARL HÖTGER
BY
ATTORNEY

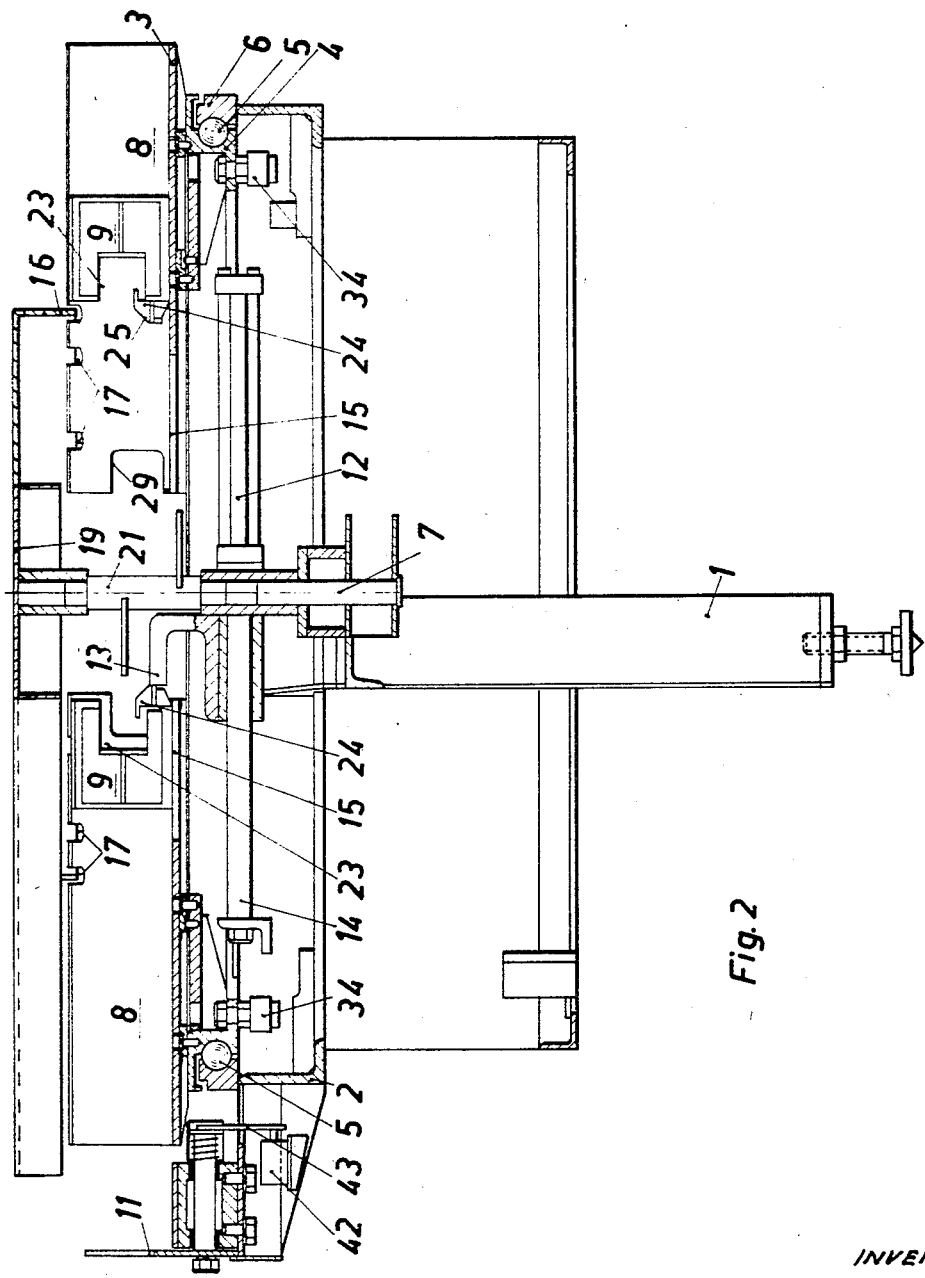

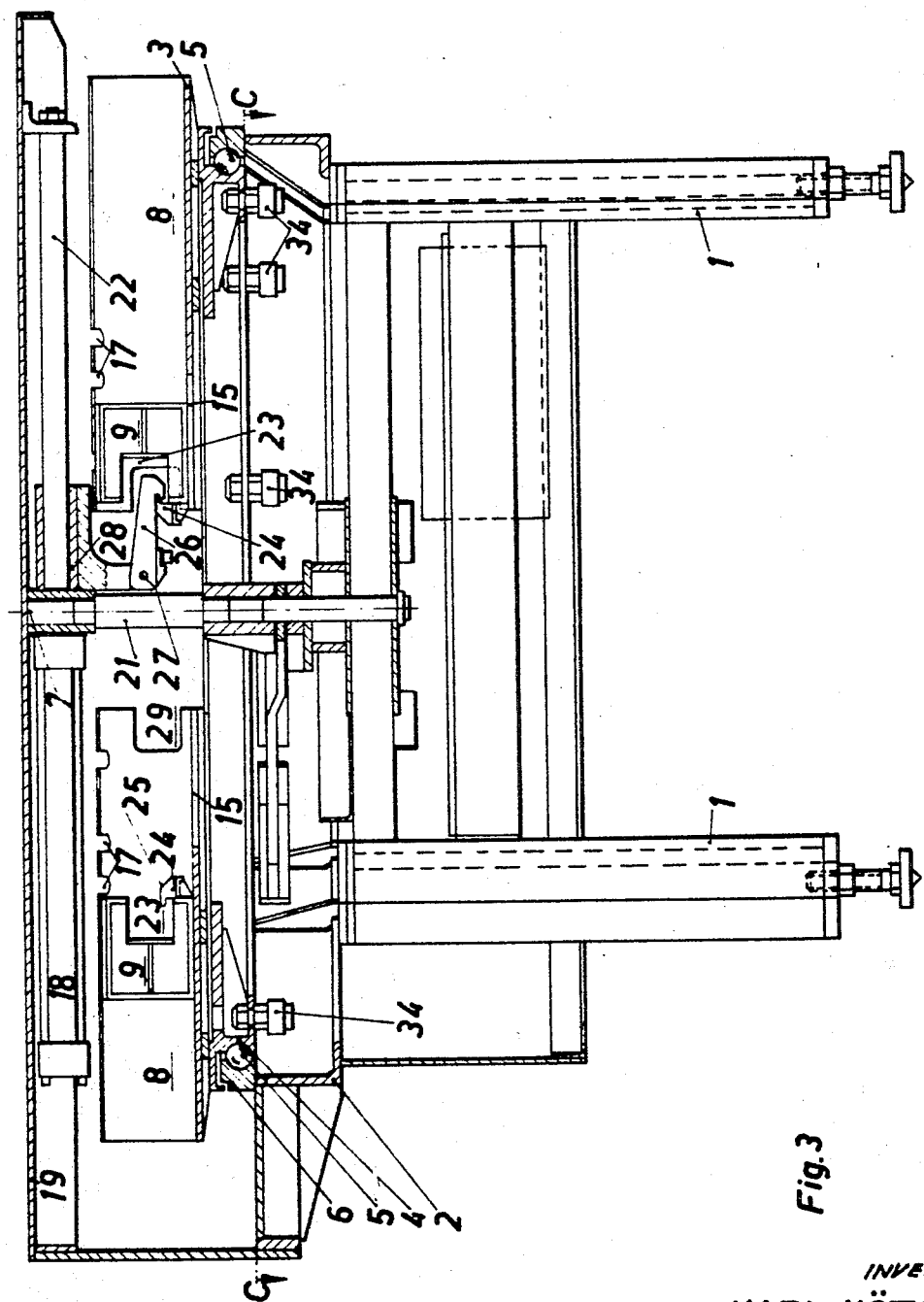

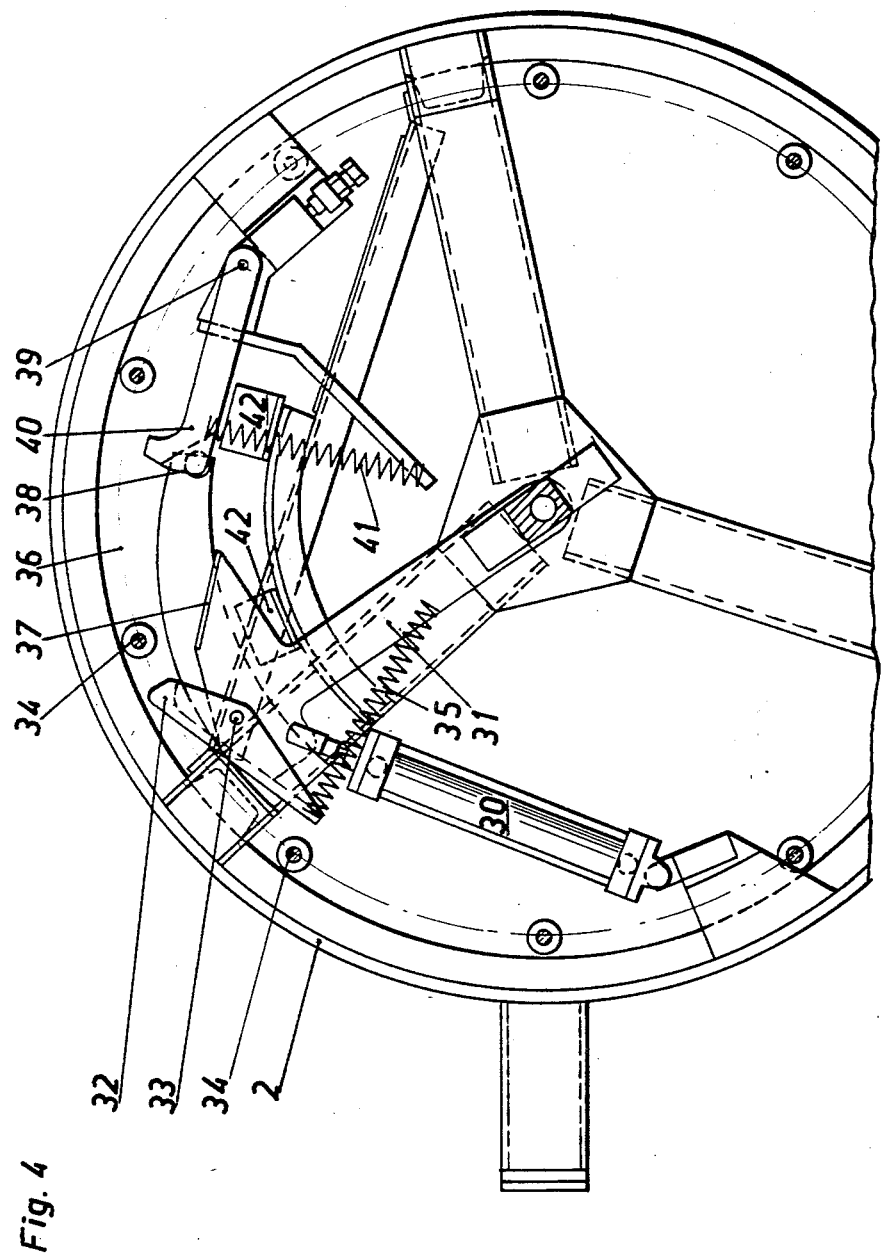

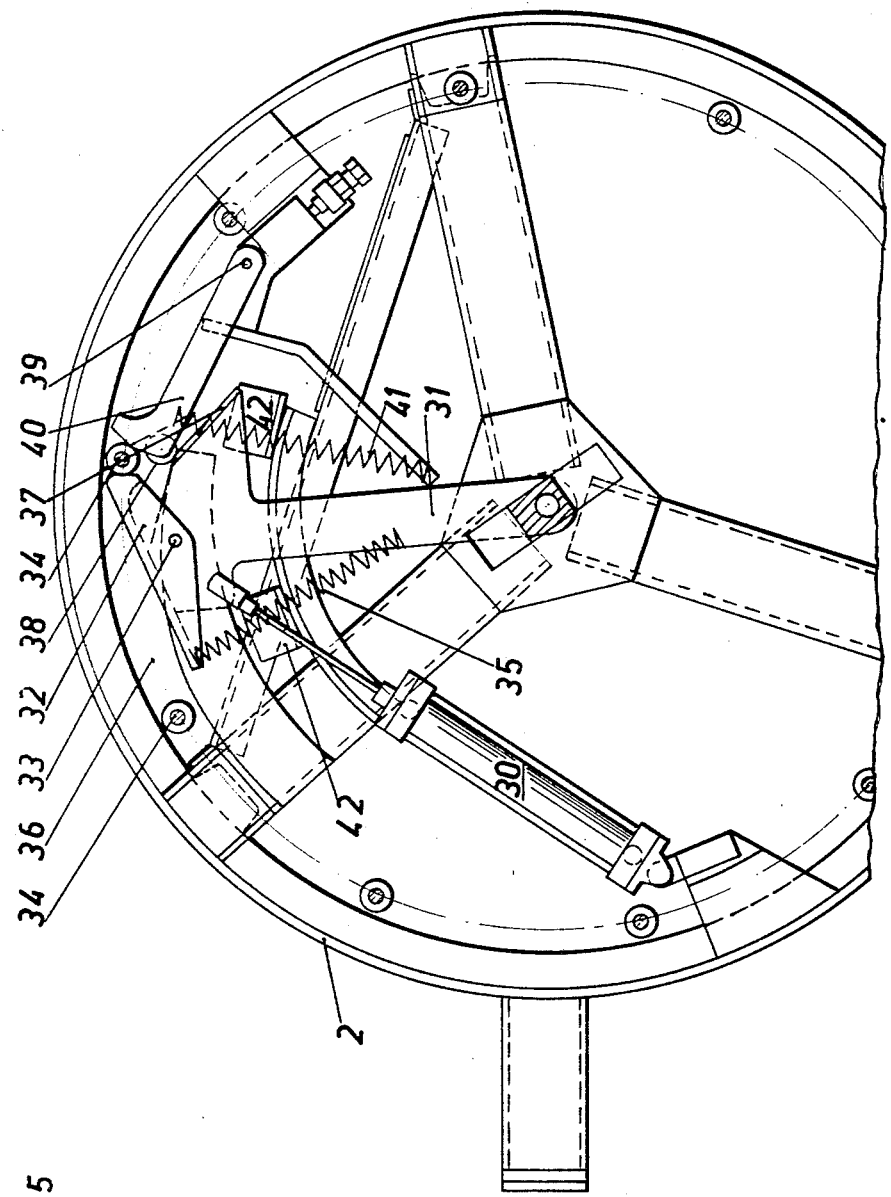

United States Patent Office 3,396,509
Patented Aug. 13, 1968

3,396,509
ROTARY TABLE PACKAGING APPARATUS
Karl Hotger, Bochum-Stiepel, Germany, assignor to Gebr.
Eickhoff, Maschinenfabrik und Eisengiesserei m.b.H.,
Bochum, Germany, a corporation of Germany
Filed June 9, 1966, Ser. No. 556,413
Claims priority, application Germany, June 11, 1965,
E 29,502
12 Claims. (Cl. 53—258)

This invention relates to packaging apparatus of the type employing a round table platform which is rotatable step-by-step for the purpose of packaging rod-shaped members that have passed a counting device.

As an overall object, the present invention provides packaging apparatus comprising a rotary table having radially extending loading channels which are open at the top and both ends, the channels extending beyond the periphery of the rotary table and subdividing it into segments. Means are provided to rotate the table step-by-step whereby each channel is stopped at a succession of stations in advancing from a loading station to an unloading station. Each channel receives a longitudinally movable piston member such that upon proper positioning of a particular channel in alignment with a stationary stop at one station about the table, the piston in that channel pushes a rod-shaped member within the channel radially outwardly against the stop. The piston member within the channel is then held in this position until the rotary table is advanced to an unloading station which preferably coincides with a conveyor belt tangentially arranged with respect to the rotary table. At this point, the aforesaid piston member within the channel ejects the rod-like member from the channel and into a container previously attached to the end of the channel or the extending end of the rod-like member. Finally, the aforesaid piston member is returned radially inwardly to its inner dead center position where it remains until it rotates to a loading station where the aforesaid process is repeated. In this manner, the whole packaging process may be performed by a single operator who merely has to observe the rotary table and attach containers either to the ends of the channels extending beyond the rotary table periphery, or to the ends of the rod-like articles extending beyond the channels.

Another object of the invention is to provide rotary table packaging apparatus of the type described wherein movement of the piston members in all channels is effected by means of only two non-rotatable drive devices. In this respect, the two drive devices for all pistons preferably comprise two double-acting fluid cylinders, one of which is disposed below the platform radially opposite the aforesaid stop, and the other of which is arranged above the platform radially opposite the point at which the packaged articles are pushed onto a tangential conveyor belt. The two fluid cylinders are disposed relative to the rotational axis of the table such that their piston rods pass through the axis of rotation of the table. Furthermore, a slot is provided in the bottom of each channel such that an arm carried on the piston rod of the lower fluid cylinder can engage the piston in the channel positioned above and move the piston radially outwardly toward the aforesaid stop. The upper pressure cylinder disposed above the channels and displaced several rotary steps relative to the lower cylinder operates simultaneously with the lower cylinder. Carried on the piston rod of the upper cylinder is a projection which extends into the open channels such that the direction of thrust of the pressure cylinders coincides always with the longitudinal axes of the channels.

A further object of the invention is to provide rotary table packaging apparatus capable of packaging rod-like articles of various lengths.

Preferably, an arcuate ledge or flange which does not rotate extends into a pair of recesses in the side walls of the channels. In this manner, the ledge or flange holds the pistons, after the latter have moved the rod-like articles toward the aforesaid stop, in the position in to which they were moved by the operation of the lower pressure cylinder and prevents the pistons from being pushed back into their starting positions when the containers or packages are attached to the ends of the rod-like articles extending beyond the channels. In the usual case a plurality of recess pairs is provided in the side walls of the respective channels at different radii such that arcuate flanges or ledges of different radii may pass therethrough. In this manner, the rotary table may be adapted for handling rod-like articles of various lengths inasmuch as the position occupied by the pistons in the plane of the stop depends upon the length of the rod-like articles and may be fixed by an arcuate flange of appropriate length in the area around the periphery of the rotary tables at which the containers or packages are forced onto the ends of the rod-like articles.

At the unloading station where packaged articles are pushed onto the aforesaid conveyor belt, it is necessary for the upper pressure cylinder to first move the piston within a channel radially outwardly and then radially inwardly. For this purpose, the inner front surface of the piston in each channel, and a linkage on the piston rod of the upper pressure cylinder extending into the channel, are designed such that upon engagement therebetween there is automatically established a connection between the two. This connection, however, is broken upon rotation of the platform. In this manner, therefore, the piston rod of the upper pressure cylinder is interlocked with an associated piston in a channel in a hook-like connection at the unloading station whereby the piston in the channel can be reciprocated in both directions. This connection is released only as a result of the rotary motion of the platform after the packaged article has been discharged from its channel.

The drive means for rotating the rotary table is arranged below the table; and in accordance with still another object of the invention, the drive means engages pins or projections on the underside of the rotary table circumferentially spaced around the periphery of the table at locations corresponding to the locations of the positions of the channels on the top of the table. In this manner, the drive means pushes the pins against a movable stop which moves into the circle defined by the pins while the table rotates and locks the pins until the next rotary step is initiated. Thus, the platform is locked in its temporary position while the two fluid cylinders above and below the table are acting simultaneously upon the rod-like articles which are being packaged.

In order to synchronize the movements of the fluid cylinders and to prevent, for example, the step-like advancement of the rotary table while the two cylinders for moving the pistons in the channels are operating, suitable control circuitry is provided which is connected to receive control signals from a counter operatively connected to the table, from limit switches responsive to the two dead center positions of the fluid cylinders, and from another limit switch that is engaged by the aforesaid stop which locks the table in position during an unloading operation.

The above and other objects and features of the invention will become apparent from the following detailed description taken in connection with the accompanying drawings, in which:

FIGURE 1 schematically illustrates a plan view of the round table platform of the invention;

FIG. 2 illustrates the round table platform of the invention in cross section along line a—a of FIG. 1;

FIG. 3 illustrates the platform in cross section along line b—b of FIG. 1;

FIG. 4 illustrates a cross-sectional view taken along line c—c of FIG. 3 showing the rotary drive means for the round table platform of the invention, with the driving fluid cylinder piston for the table being in its retracted dead center position; and FIG. 5 illustrates the same cross-sectional view as FIG. 4, but with the driving fluid cylinder piston being in its front dead center position.

With reference now to the drawings, and particularly to FIGS. 1, 2 and 3, the rotary table apparatus of the invention includes a frame 2 (FIGS. 2 and 3) supported by three upstanding legs 1 that are adjustable in height. The rotary table 3 itself is disposed on the frame 2 and mounted for rotation about a vertical axis 7 by means of ball bearings 5. As shown, the bearings 5 are disposed in cooperating races formed in an annular ledge or flange 4 on the rotary table 3 and an annular flange 6 on the frame 2. As shown in FIG. 1, there are arranged on the table 3 radially extending and circumferentially spaced loading channels 8 having ends extending beyond the table platform periphery. The channels 8 are open at the top and ends, with each channel accommodating a reciprocable member 9 of cross-sectional configuration corresponding substantially to the rectangular cross section of its associated channel. As shown, the upper ends of the side walls of each channel are bent inwardly so as to partially overlap and assist in guiding each member 9 in the longitudinal direction of the channel.

The rod-like articles B to be packaged (FIG. 1) are measured by weight or number and placed through a chute or hopper, not shown, into an associated one of the loading channels 8 positioned at a loading station A at one point around the periphery of the table 3. The rod-like articles B may for example, comprise electrodes. The reciprocable member 9 in the channel located at the loading station A is initially in its radially innermost dead center position. In the described embodiment of the invention, the ends of the electrodes to be packaged extend beyond the channels 8 and engage an arcuate guideway 10 which extends from the loading station A to a stop 11 in the clockwise direction of rotation of the table 3. After an electrode or other rod-like article has been loaded into a channel at the loading station A, the table 3 is rotated clockwise whereby the previously-loaded electrode B is moved into engagement with the stop 11 while the following channel 8 at loading station A is loaded. With the electrode in engagement with the stop 11, the member 9 within the channel 8 is forced against the electrode to push it against the stop 11.

The apparatus for pushing electrodes against the stop 11 is shown in FIG. 2 and includes a generally C-shaped arm 13 carried on the piston rod 14 of a fluid cylinder 12. The arm 13 is secured to the piston rod 14 which itself extends beyond the arm for a purpose presently to be explained. The arm 13 extends through a bottom slot 15 in an associated one of the channels 8 such that when the cylinder 12 is pressurized to move the arm 13 to the left as viewed in FIG. 2, the member 9 will be moved to the left to force an electrode positioned within the channel 8 against the stop 11. The member 9 and electrode thereafter remain in these positions while the fluid cylinder 12 retracts the piston rod 14 and the arm 13 to the right and into the dead center position shown in FIG. 2.

After an electrode is thus pushed against the stop 11, the table 3 is again rotated in a clockwise direction through two additional rotary steps, whereupon an operator attaches or forces a container or package C (FIG. 1) over the electrode end extending beyond the channel 8. The length of the electrode extending beyond the channel was, of course, previously determined by the position of the stop 11. An arcuate flange 16, depending downwardly from a hood 19 suported on a central spindle 21, projects into one of a pair of recesses 17 (FIGS. 2 and 3) provided in the side walls of the respective channels 8. In this manner, the flange 16 provides an abutment for the members 9 and prevents them from being pushed back to their radially inner dead center positions while the container C is forced over the end of the electrode by an operator. By providing additional pairs of recesses 17 (FIGS. 2 and 3) located at smaller or larger radial distances from the axis 7, in combination with a correspondingly dimensioned flange 16, the platform may be adapted for packaging electrodes of different lengths.

After additional rotary or arcuate steps, and upon arrival of the electrodes and the containers or packages attached thereto at the station D shown in FIG. 1, the electrodes are positioned in a vertical plane which also contains a fluid cylinder 18. As shown in FIG. 3, the cylinder 18 is disposed above the channels 8 and covered by the hood 19. At station D, the electrodes are pushed completely into their containers C by the members 9 under the force of cylinder 18. Note that the container, at station D, has passed onto a conveyor belt 20 and is held thereon as the electrode or other device is pushed completely into the container. Thereafter, the conveyor belt 20 transports the completed, packaged product to a remote point.

Thus, during each rotary step of the table 3, the following occurs: (1) at loading station A an electrode is inserted into a channel 8; (2) at the next succeeding clockwise station as viewed in FIG. 1 the electrodes are pushed against the stop 11 so that a selected length of the electrode extends beyond the channel 8; (3) a container or package C is pushed onto the end of an exposed electrode by an operator; and (4) at unloading station D, the member 9 serves to force the electrode B completely into the container C while at the same time depositing it on the conveyor belt 20.

In order to keep the packaging apparatus compact, the two cylinders 12 and 18 shown in FIGS. 2 and 3, respectively, are supported by the axle or spindle 21 coincident with the axis of rotation 7 of the table 3. The piston rod 14 of the lower cylinder 12 and piston rod 22 of the upper cylinder 18 are at right angles relative to the spindle 21; and, hence, the two fluid cylinders 12 and 18 are located in planes that contain a channel 8 above or below the cylinders 12 and 18, as the case may be.

While the fluid cylinder 12 moves the members 9 in the individual channels 8 in one direction only toward the stop 11, the cylinder 18 must also effect retraction to the members 9 to their radially innermost dead center positions in order to enable a succeeding loading operation of the electrodes into the channels at the loading station A. In this respect, it will be noted that each of the pistons 9 has at its radially innermost surface a recess 23 (FIG. 3) which extends across the entire width of the piston. The lower radially innermost edge of each recess 23 is provided with a lower hook-shaped ledge 24 provided with a cam surface 25 (FIG. 2) which is engaged by a horizontal finger or latch 26 mounted for pivotal movement about a pin 27 on a downwardly-depending arm 28 secured to the piston rod 22 of cylinder 18. When the arm 28 shown in FIG. 3 is forced to the right, for example, the latch 26 first engages the cam surface 25 and passes thereover into the slot or recess 23. Thereafter, it pushes the member 9 outwardly. In this process, the electrode within the channel 8 is, of course, completely forced into the container C and onto the conveyor belt 20.

During the retraction step, the latch 26 engages the backside of the latch or ledge 24, under its own weight, and moves the piston 9 backwardly into its radially innermost dead center position as viewed in FIG. 3. The next following rotary step of the platform moves the member 9 away from the finger 26 which can simply slip out of the recess 26 and through an opening 29 in each channel during the rotation step.

As best shown in FIGS. 4 and 5, the rotary table 3, supported on the ball bearings 5, is used to rotate step-by-step by means of a fluid cylinder 30. One end of the cylinder 30 is pivotally connected to the frame 2 while its piston rod is pivotally connected to a lever 31 which rotates about axis 7 on spindle 21. The lever 31 carries at its radially outermost end a double-arm gripper 32 pivotally movable about a pin 33. Circumferentially spaced around the bottom of the table 3 shown in FIGS. 2–5 are a plurality of pins or projections 34. Hence, as the cylinder 30 is pressurized, it will move the lever 31 from the position shown in FIG. 4 to that position shown in FIG. 5. In this process, the front surface of the gripper 32, under the force of spring 35, engages an associated one of the pins 34 and forcibly rotates the table through one rotary step.

As the lever 31 is rotated in a clockwise direction as viewed in FIGS. 4 and 5, a forward cam surface 37 engages a cam roller 38 on a stop member 40. The stop member 40 is pivotally connected to the frame as at 39 and is normally held in the position shown in FIG. 4 by means of a spring 41. However, when the lever 31 is moved in a clockwise direction from the position of FIG. 4 to that of FIG. 5, the cam surface 37 engages the cam roller 38 to move the stop member 40 radially outwardly whereby the stop member 40 limits the amount of rotation of the table 3 by engagement with an associated one of the pins 34.

The table 3 remains locked between thhe stop 40 and the gripper 32 during loading and unloading operations. Only after the occurrence of a command signal for the next rotary step does the cylinder 30 retract and then expand to effect rotation of the table 3 through another step. During retraction of the cylinder 30, the lever 31 rotates in a counterclockwise direction, thereby permitting the stop member 40 to move radially inwardly under the force of the spring 41. At the same time, the gripper 32 slides under the next succeeding pin 34 and is rotated in a counterclockwise direction against the force of spring 35 until the right end of the gripper arm 32 passes the next pin 34. At this point, the spring 35 will rotate the gripper arm 32 into the position shown in FIG. 4, whereupon the cylinder 30 is pressurized in the opposite direction and the succeeding cycle of operation is repeated to advance the table 3 through another rotary step.

The cylinders 12, 18 and 30 are preferably of the pneumatic type supplied with air under pressure by means of electromagnetically operated valves, not shown. Control signals for the valves are received from a control circuit, not shown, which receives signals from limit switches 42 (some of which are shown in the application), which are engaged by the piston rods of cylinders 12, 18 and 30 in the opposite dead center positions thereof. The spring-biased stop of FIG. 2 likewise actuates through member 43 a limit switch 42. WIth this arrangement, cylinder 30 will be pressurized in response to a command signal to move lever 31 counterclockwise until both of the switches 42 in FIGS. 4 and 5 are actuated. At this point, the cylinder is reversed and the table 3 moved through one step. Following this, both cylinders 12 and 18 are pressurized to move their pistons radially outwardly while table 3 is locked in position. The piston for cylinder 18 will move outwardly until its piston rod engages a limit switch at its extreme limit of travel, whereupon the cylinder 18 will be pressurized in the opposite sense to move the piston rod and arm 28 back into their original positions. They will remain in these positions until the next rotary step of table 3 is completed. The same is true of cylinder 12 except that it will be reversed either at the extreme limit of its outward travel or by limit switch 42, indicating that the rod-like article B is in abutment with stop 11. Cylinder 30 will thereafter not be actuated to start a succeeding cycle of operations until the pistons for both cylinders 12 and 18 are in their radially innermost positions.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Apparatus for packaging rod-like articles, comprising a generally circular table rotatable about a central axis, a plurality of radially-extending article-receiving channels circumferentially spaced around said table, a piston member reciprocably carried within each channel, means to rotate the table step-by-step whereby each channel is stopped at a succession of stations while proceeding from a loading station to an unloading station, a stop member positioned beyond the periphery of the table at one of said stations and in alignment with a channel at that station, non-rotatable drive means at said one station for forcing a piston member in a channel and a rod-like article previously deposited in said channel radially outwardly until the rod-like article engages said stop member with a portion of the article projecting beyond the end of the channel, means positioned beyond said one station in the rotational path of travel of said table for preventing radial inward movement of a piston member and an article in a channel while a package is passed over the radially outermost end of said article, article-receiving means located beyond the periphery of said table at an unloading station which is beyond said loading station and said one station in the path of travel of said table, and second non-rotatable drive means at said unloading station for forcing a piston member in a channel at the unloading station radially outwardly whereby the article is pushed completely into said package and onto said receiving means.

2. The apparatus of claim 1 wherein each of said channels is open at the top and both ends, and wherein the first and second drive means each comprise a double-acting fluid cylinder, one of said cylinders being located below the rotatable table and in alignment with a channel at said one station, and the other cylinder being above said rotatable table and in alignment with a channel at said unloading station.

3. The apparatus of claim 2 wherein the rotatable table is supported on a central axis, the two fluid cylinders being supported on said axle and provided with piston rods which extend through the central axis of the axle.

4. The apparatus of claim 2 wherein a slot is provided in each of the channels, the slot extending radially outwardly beyond the front surface of the piston member in that channel when the piston member is in its radially innermost position, the other end of the slot terminating at the radially innermost end of the channel, and an arm carried on the piston rod of said one fluid cylinder below the table, said arm projecting through said slot to engage and move a piston member within a channel.

5. The apparatus of claim 2 including means for connecting the piston rod of said other fluid cylinder above the table to said piston members in said channels when they arrive at said unloading station, said connecting means enabling both radially outward and inward movement of a piston member within its channel under the force of said fluid cylinder but permitting mutual disengagement of the piston rod and piston member within said channel upon rotation of the table.

6. The apparatus of claim 5 wherein the radially innermost surface of each piston member is provided with a recess extending across the entire width of the piston member, the recess being restricted by a lower ledge having an oblique cam surface on the radially innermost front surface thereof, the means for connecting the piston rod of said other fluid cylinder to said piston members comprising a pivoted hook on said piston rod which is adapted to be forced over said oblique cam surface and into said recess, said hook being removed from the recess upon rotation of said table whereby the hook will pass out of said recess in a direction which is perpendicular to the radius of said table.

7. The apparatus of claim 6 wherein said means for preventing radial inward movement of a piston member comprises recesses in the side walls of said channels into which an arcuate flange projects for limiting the displacement of the piston members within their channels between said one station and said unloading station.

8. The apparatus of claim 7 wherein said arcuate flange defines an arc of a circle having a center coinciding with the axis of rotation of said table.

9. The apparatus of claim 1 including an arcuate guideway disposed beyond the periphery of said rotatable table and extending between said loading station and said one station for supporting the ends of rod-like articles deposited in said channels.

10. The apparatus of claim 9 wherein said stop member is carried on said arcuate guideway at said one station.

11. The apparatus of claim 1 including pins projecting downwardly from said table and circumferentially spaced about the periphery of the table through arcuate distances corresponding to the step-by-step movement of the table, the means to rotate the table step-by-step being located beneath the table and including a lever movable into the circle defined by said pins to engage a pin and rotate the table, the means to rotate the table also including a stop member which is movable into said circle defined by the pins for the purpose of stopping the table after it has been moved through one step in advancing a channel from one station to the next succeeding station.

12. The apparatus of claim 11 wherein said lever is rotatable about the axis of rotation of said table, and including a double-acting fluid cylinder engaging the outer free end of the lever, a double-arm gripper mounted for pivotal movement at the outer free end of said lever, spring means for rotating said gripper into a position where its one end will project into the path of the circle defined by said pins when the lever is rotated in one direction whereby said one end will engage a pin to rotate the table when the lever is rotated by said fluid cylinder, and means on said lever for forcing said stop member into said circle defined by the pins as the lever is rotated in said one direction by said fluid cylinder.

References Cited

UNITED STATES PATENTS 2,010,196   8/1935   Muller _____ 53—169 X

WILLIAM W. DYER, JR., *Primary Examiner.*

R. ALVEY, *Assistant Examiner.*